No. 788,858. PATENTED MAY 2, 1905.
W. H. TROUT.
SAWMILL SET WORKS.
APPLICATION FILED JAN. 6, 1903. RENEWED FEB. 23, 1905.

6 SHEETS—SHEET 2.

Witnesses
Inventor:
William H. Trout,
by Dodge and Sons,
Attorneys

No. 788,858. PATENTED MAY 2, 1905.
W. H. TROUT.
SAWMILL SET WORKS.
APPLICATION FILED JAN. 6, 1903. RENEWED FEB. 23, 1905.

6 SHEETS—SHEET 4.

Witnesses
D. E. Burdule
J. B. Malnato

Inventor:
William H. Trout,
by Dodge and Sons,
Attorneys

No. 788,858. PATENTED MAY 2, 1905.
W. H. TROUT.
SAWMILL SET WORKS.
APPLICATION FILED JAN. 6, 1903. RENEWED FEB. 23, 1905.
6 SHEETS—SHEET 5.
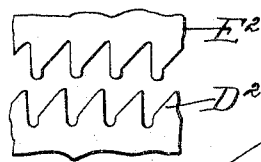
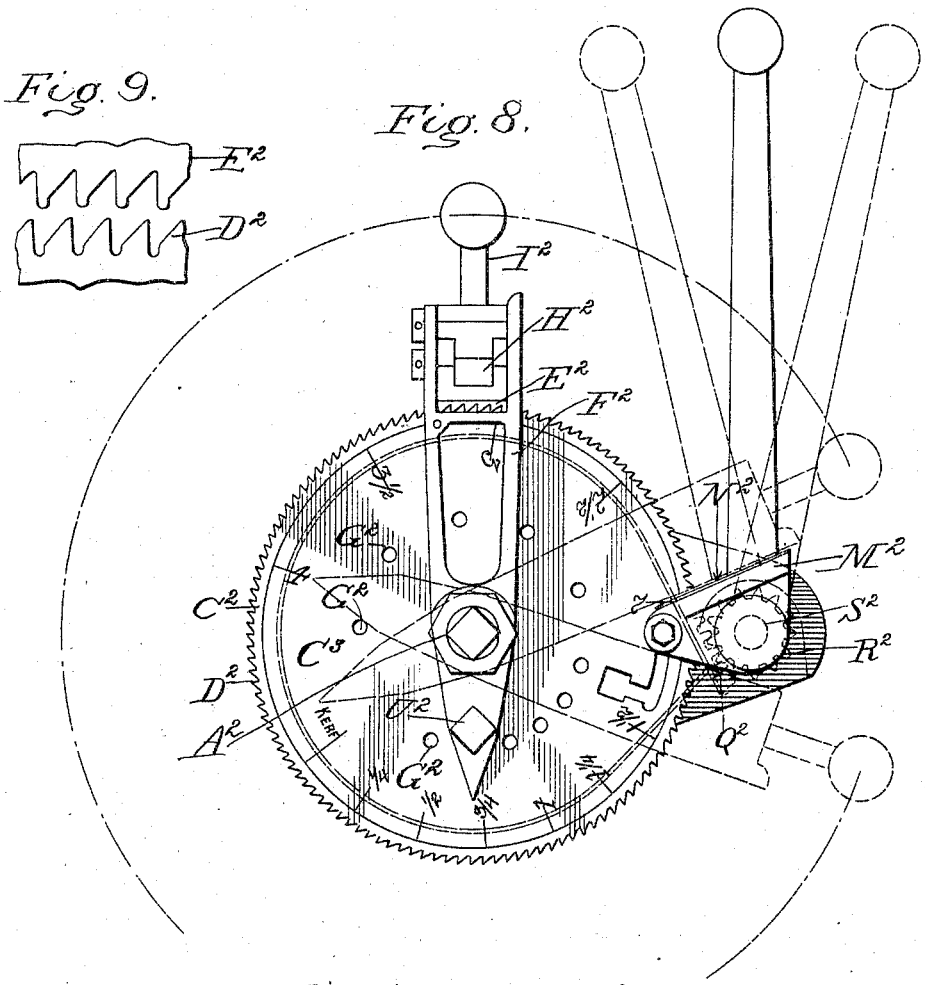
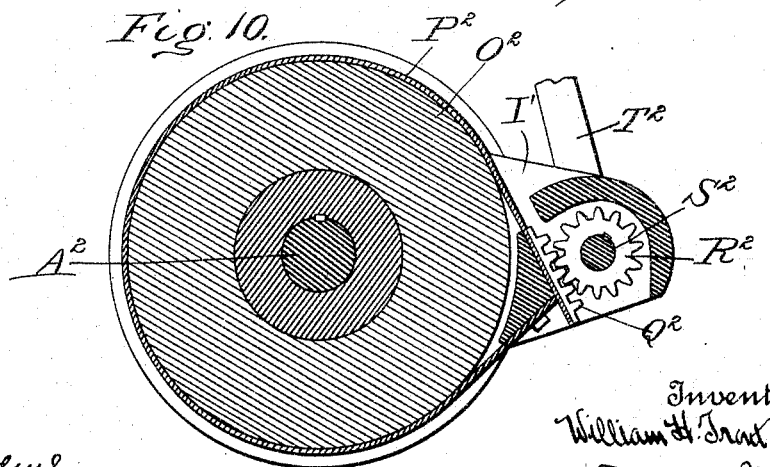

No. 788,858. PATENTED MAY 2, 1905.
W. H. TROUT.
SAWMILL SET WORKS.
APPLICATION FILED JAN. 6, 1903. RENEWED FEB. 23, 1905.
6 SHEETS—SHEET 6.
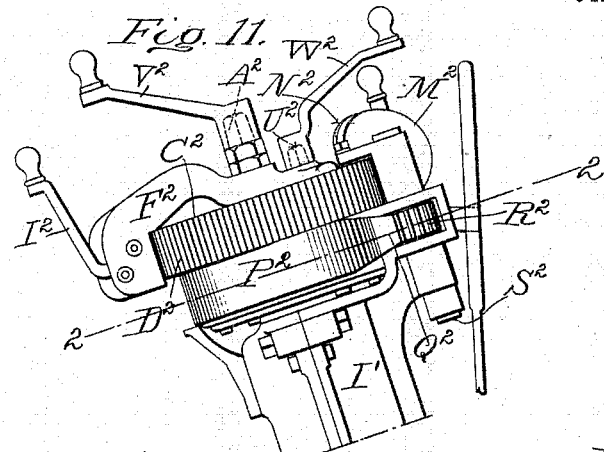
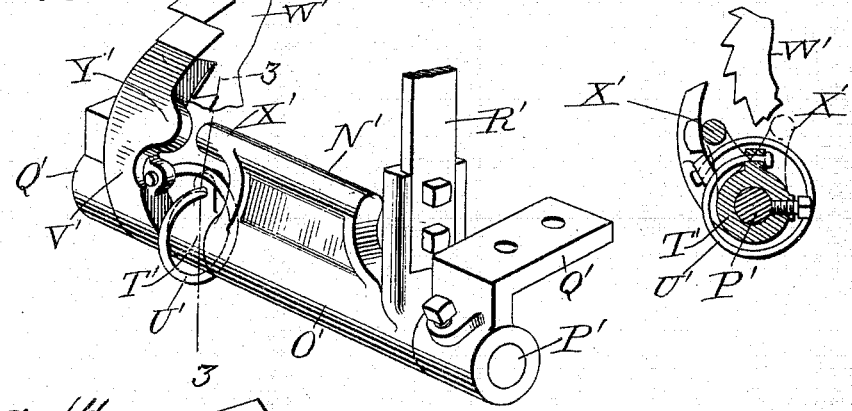
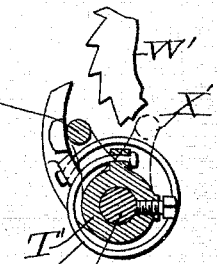
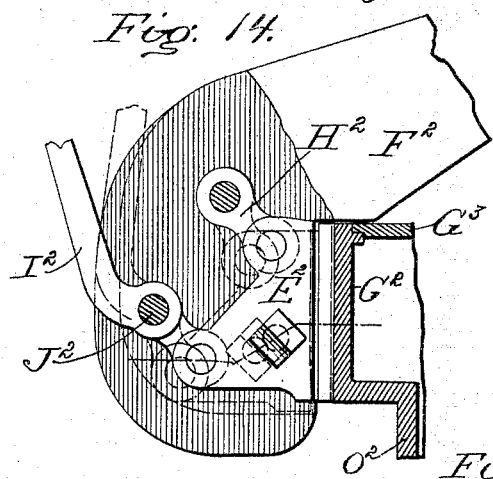
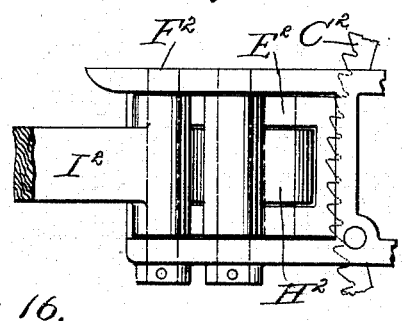
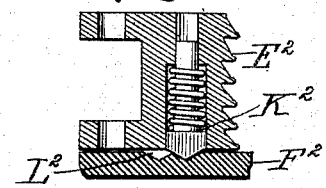
Witnesses
D. E. Burdine
J. B. Malnato
Inventor:
William H. Trout,
by Dodge and Sons.
Attorneys.

No. 788,858.

Patented May 2, 1905.

UNITED STATES PATENT OFFICE.

WILLIAM H. TROUT, OF MILWAUKEE, WISCONSIN, ASSIGNOR OF ONE-HALF TO ALLIS-CHALMERS COMPANY, OF CHICAGO, ILLINOIS, A CORPORATION OF NEW JERSEY.

SAWMILL SET-WORKS.

SPECIFICATION forming part of Letters Patent No. 788,858, dated May 2, 1905.

Application filed January 6, 1903. Renewed February 23, 1905. Serial No. 246,915.

*To all whom it may concern:*

Be it known that I, WILLIAM H. TROUT, a citizen of the United States, residing at Milwaukee, in the county of Milwaukee and State of Wisconsin, have invented certain new and useful Improvements in Sawmill Set-Works, of which the following is a specification.

My present invention pertains to improvements in sawmill set-works of the character described in my copending application, Serial No. 17,024, and the construction and advantages of which will be hereinafter set forth.

Certain portions of my invention are described herein, but are not claimed herein, as they are claimed in my copending application hereinbefore acknowledged.

In the description of my invention reference is made to the annexed drawings, wherein—

Figure 1:
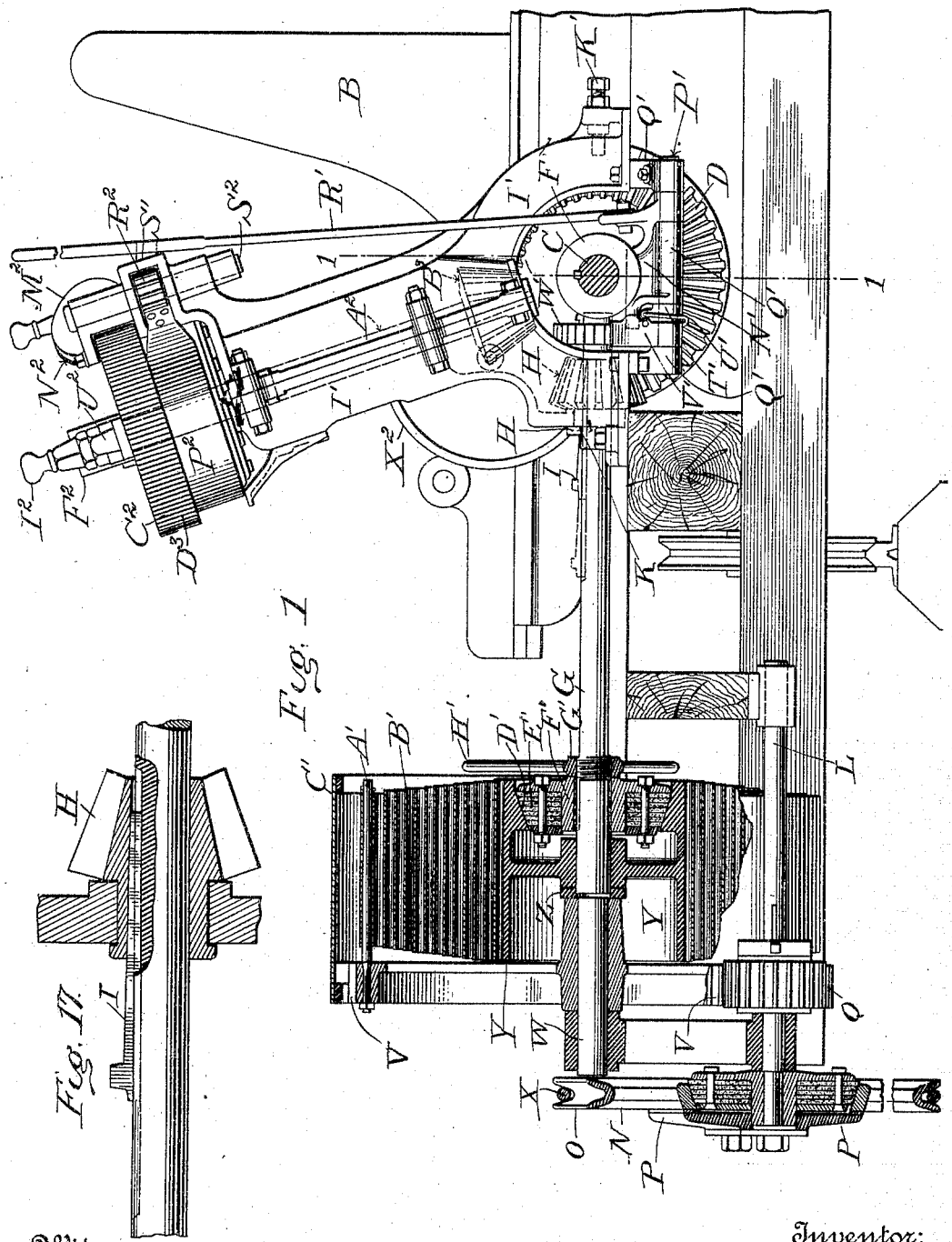
Figure 2:
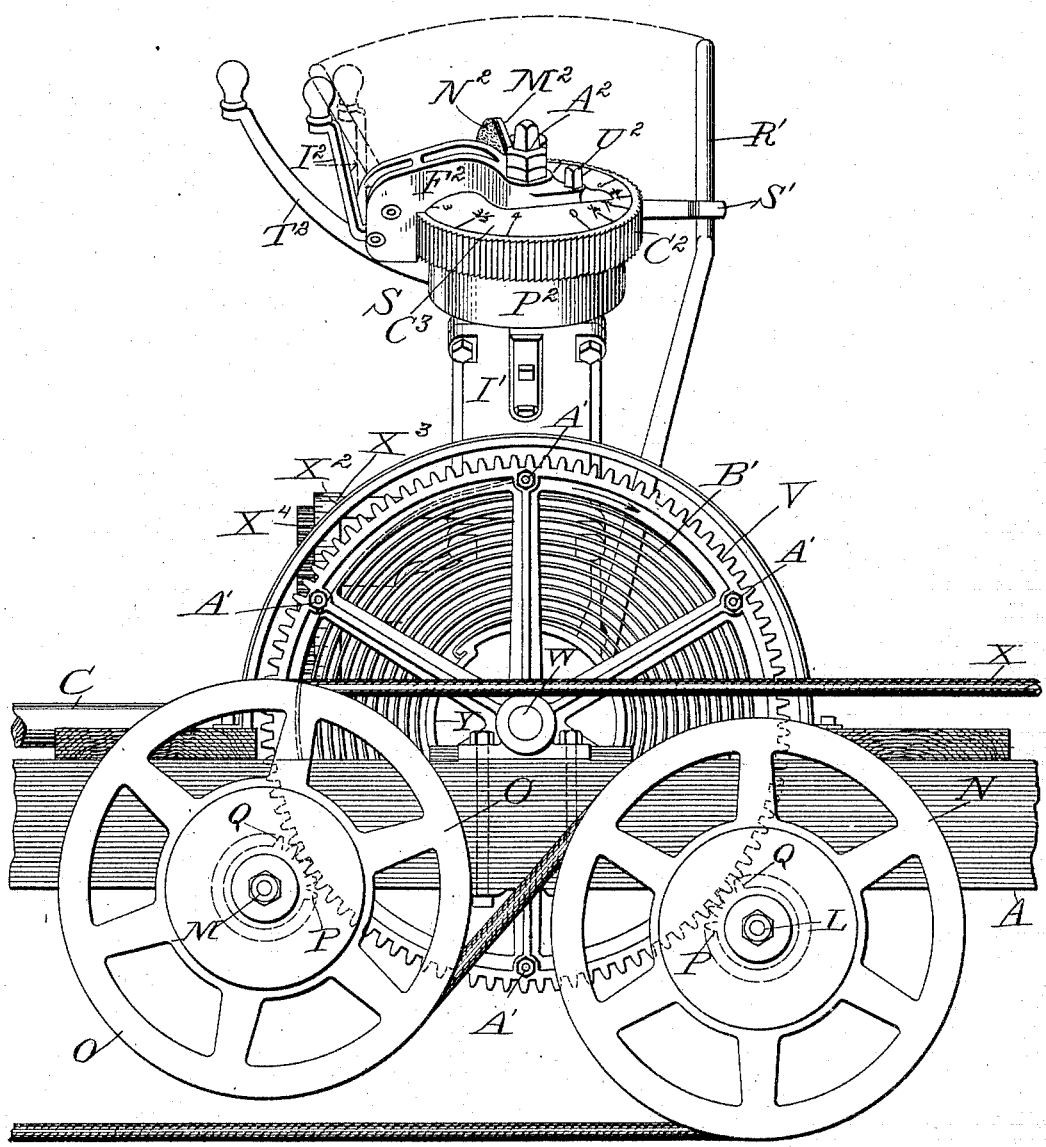
Figure 3:
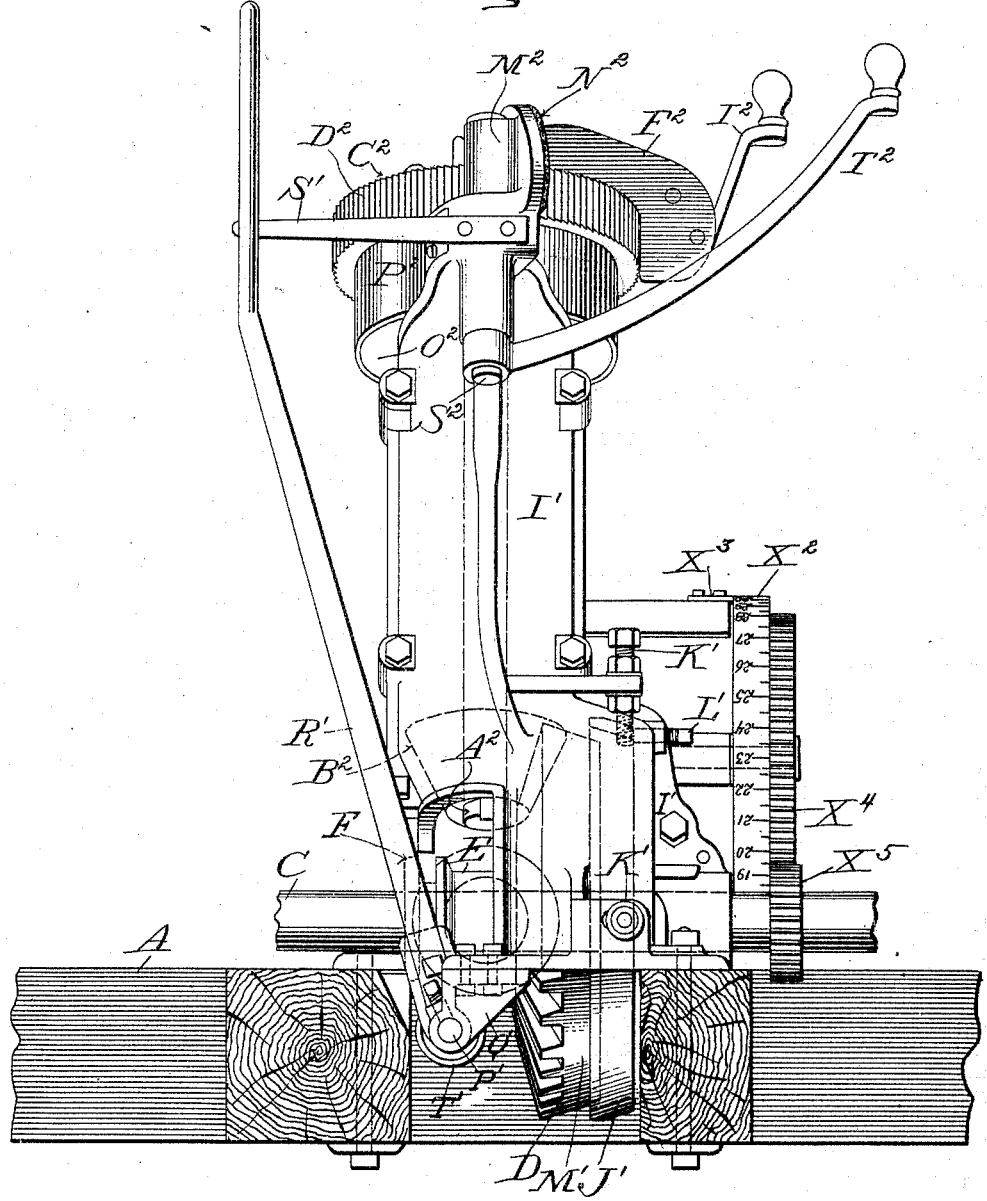
Figure 4:
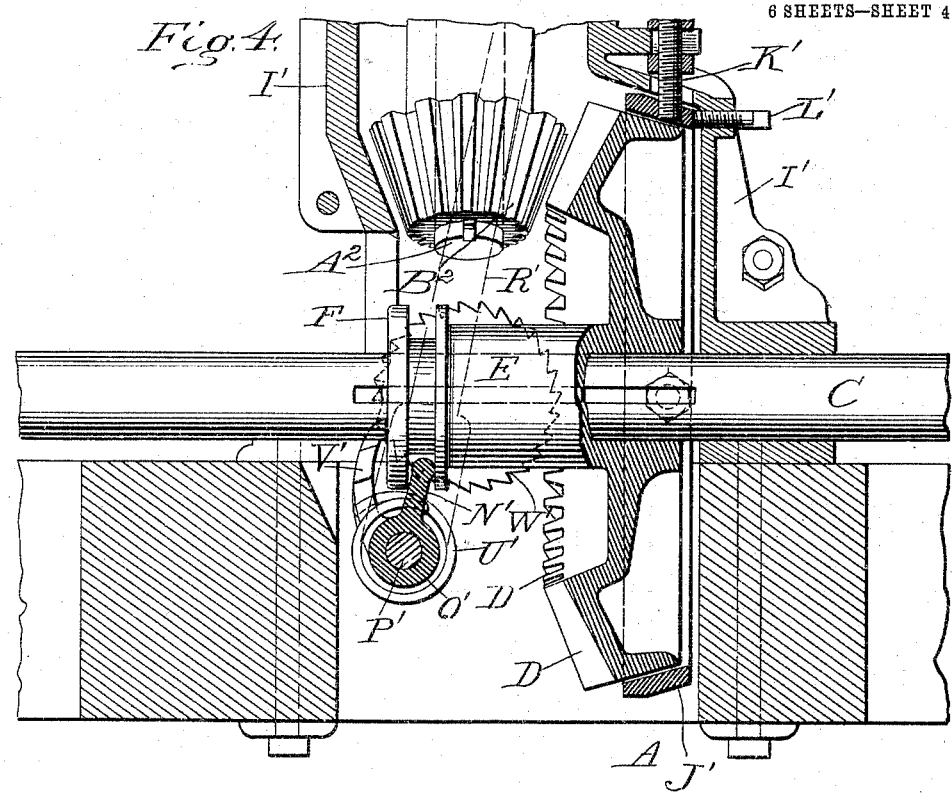
Figure 5:
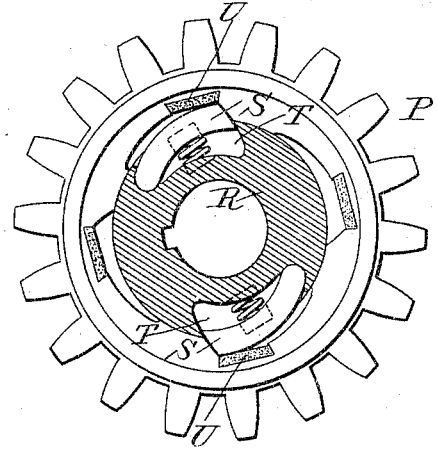
Figures 6, 7:
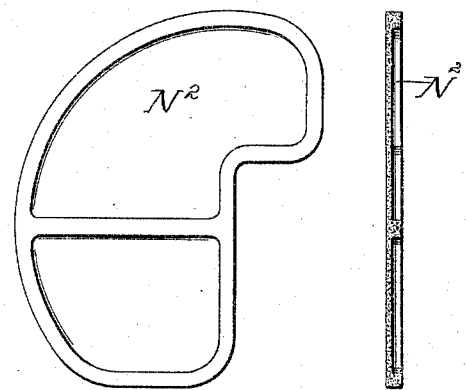

Figure 1 is a transverse sectional view of a portion of a sawmill-carriage, showing my invention applied thereto; Fig. 2, a side elevation of the operative mechanism looking toward the saw side of the carriage; Fig. 3, a similar view looking in the opposite direction, the carriage being broken away; Fig. 4, a vertical sectional view of certain portions of the operative mechanism, taken on the line 1 1 of Fig. 1; Fig. 5, a detail view of one of the clutch-pinions; Fig. 6, a rear face view of the buffer employed to arrest the setting movement; Fig. 7, a sectional view thereof; Fig. 8, a top plan view of the setting dial-plate and allied mechanism; Fig. 9, a detail view illustrating the form of teeth or locking-faces used upon the index-wheel and locking-block; Fig. 10, a transverse sectional view taken on the line 2 2 of Fig. 11; Fig. 11, a side elevation of the set-controlling mechanism, showing the auxiliary cranks which may be applied thereto when the setting and receding are to be done by hand; Fig. 12, a detail perspective view of the gear-shifter and locking-pawl; Fig. 13, a vertical sectional view taken on the line 3 3 of Fig. 12; Fig. 14, a vertical sectional view of the indicator-arm, the locking-block, and operative connections for moving said block; Fig. 15, a top plan view thereof; Fig. 16, a horizontal sectional view of the locking-block, showing the spring-actuated retaining-pin; and Fig. 17, a detail view of certain portions of the mechanism.

The advantages of the construction about to be described will appear from the following description:

Referring to the drawings, A denotes a sawmill-carriage which is mounted to run upon the usual ways or tracks and is provided with setting-knees of any approved type, as indicated in outline in Fig. 1 and denoted by the reference-letter B. Said knees are in operative connection with a set-shaft C, which extends lengthwise of the carriage in the usual manner. Feathered to said shaft C and slidably mounted thereon is a bevel-gear D, said gear being formed with an elongated hub E, provided at its outer end with a collar or recessed portion F. A second shaft G extends across the carriage at approximately right angles to the set-shaft, and at the end adjacent to the gear D there is secured to it a bevel-pinion H. Said pinion H, as will be seen upon reference to Fig. 17, is provided with an elongated hub, through which the shaft extends and to which it is secured by a feather or key I. The elongated hub of pinion H works in a bearing K at the innermost end of the shaft.

The shaft G will hereinafter be termed the "operating-shaft," and motion is imparted thereto, and consequently to the set-shaft, when the gear D and pinion H are in engagement, by the following mechanism: Secured to the under side of the carriage-timbers are two shafts L and M. The shaft L is provided at its outer end with a rope-sheave N, while shaft M is provided with a similar sheave O. As will be seen upon reference to Fig. 1, these sheaves are connected to the respective shafts by friction wheels or clutches P, which may be set up to any required degree by the nuts upon the outer ends of the shafts. Each of the shafts L and M is provided with a pinion Q, the detail construction of which is shown in Fig. 5, wherein it will be noted that the hub R of the pinion is keyed to the shaft and carries a series of outwardly-spring-pressed pawls or detents S, which pass into recesses T, formed in the inner face of the pinion or toothed member. The bases of these recesses will be provided with cushions U, of any suitable material, in order to deaden the noise that would otherwise be caused when the detents are pushed outwardly into the recesses by the action of the springs. The pinion Q upon the shaft L is a right-hand pinion, while that upon the shaft M is a left-hand pinion. These pinions are in mesh with a large gear or spur wheel V, loosely mounted upon the end portion W of the shaft G, so that any motion which is imparted to the pinions will be transmitted to said gear-wheel V in a continuous direction or in the direction indicated by the arrow in Fig. 2.

In order to impart motion to the sheaves, and consequently to the pinions and the spur-wheel, a fixed rope X is passed about the sheaves, as indicated in Fig. 2. A drum Y is loosely mounted upon the operating-shaft G and bears against collar Z, fixed upon shaft G and interposed between the hub of said drum and the hub of the spur-wheel V, as shown in Fig. 1. This spur-wheel carries a series of pins A', said pins extending outwardly therefrom over the drum Y. A heavy volute spring B' is mounted upon the drum, one end of said spring being secured to the drum, while the outer end is secured to one of the fixed pins A'. The other pins of the series tend to confine the spring within limits and to prevent its spreading out so as to interfere or come into contact with the shafts L and M and into contact with the hood or cover C', secured to the carriage over the spring, as is best indicated in Figs. 1 and 2.

The drum Y is provided at one end with an interiorly-beveled face D', and bearing against said face is a friction-cone E', the hub F' of which is feathered to the operating-shaft G. Said shaft adjacent to the sliding friction member is threaded, and a nut G', having handles H', is mounted on said threaded portion and bears against the outer end of the hub F'. By turning the nut G' the degree of friction exerted between the inclined face on the drum and the friction member may be regulated as desired.

From the description thus far given it will be seen that the forward and receding movements of the carriage will put the spring B' under tension and that said spring will rotate the operating-shaft G, and consequently the pinion H carried thereby. If said pinion be in mesh with the gear D, then said gear will be rotated, as will the set-shaft, causing the knees to be moved forward.

It is proposed to employ the usual spring or springs for imparting a receding motion to the set-shaft. The spring or springs, which are not herein shown, are placed under tension by the forward rotation of the set-shaft in the act of advancing the knees.

Mounted upon the carriage over the set-shaft is a column or standard I', preferably made in sections and given a rearward inclination, as shown most clearly in Figs. 1 and 3.

A beveled friction cone or ring J', Fig. 4, is mounted in the lower portion of said column I', being held in place therein by bolts K', three of which are employed. These bolts extend into openings formed in said cone or ring, while screws L', which are mounted in the base of the column, extend inwardly and bear against the rear face of the cone or ring. These screws facilitate the adjustment of the cone or ring toward the smooth beveled face M', Fig. 3, formed upon the outermost portion of the gear D. The cone or ring J' constitutes a friction member and serves to arrest the rotation of the gear D when said gear is moved backward into contact therewith, and as a consequence serves to prevent the receding rotation of the set-shaft. With this construction the receding movement may be arrested as desired.

In order to effect the longitudinal shifting of the gear D upon the set-shaft, I provide a shifter or rocker arm N', Figs. 4 and 12, which works in the collar or recessed portion F, formed upon the outer end of the hub E. The shifter extends upwardly from a sleeve O', journaled upon a shaft P', which is rigidly fixed in brackets or hangers Q', bolted to the under face of the column or other stationary portion of the carriage-frame. The sleeve O' has connected to it a receding lever R', which extends upwardly into a position where it may be readily grasped by the operator and is normally held in its inoperative position by spring arm or holder S', Fig. 2. A collar T', Fig. 12, is rigidly fixed to the shaft P', and a spring U' is connected to a lug or ear extending upwardly from said collar, the spring passing about the collar and being connected at its outer end to a pawl or detent V', loosely mounted upon the shaft P'. Said pawl is arranged in line with a ratchet-wheel W', Figs. 1 and 4, keyed to the innermost end of the operating-shaft G. As thus constructed and arranged the pawl will hold the operating-shaft against rotation when the gear D is moved on the set-shaft, so as to withdraw the said gear from operative relation with the pinion H, or, in other words, when the gear D is moved out of contact with the pinion H in order to permit the receding spring to rotate the set-shaft in a direction opposite to that in which it would be moved by the operating-shaft G when said shaft is rotated by the spring B'.

In order that the gear D may be brought into complete working position with relation to the pinion H before the pawl V' is withdrawn from the locking ratchet-wheel W', the gear-shifter or rocker-arm N', Fig. 12, is provided with a projection X', which comes into operative relation with a similar projection Y', formed on the pawl. These projections, however, do not come into operative relation with each other until such time as the teeth of the gear D have fully entered the spaces between the teeth of the pinion H.

In order to control the operation of the power mechanism, and consequently the rotation of the set-shaft and the set, I employ devices which will now be described in detail.

Mounted within the column I' is a shaft $A^2$, Figs. 1 and 2, the lower end of which carries a bevel-pinion $B^2$, while the upper end of the shaft has secured to it a wheel $C^2$, which works about or around a dial-plate $C^3$. The pinion $B^2$ is in line with the gear D and meshes therewith when said gear is in operative relation with the pinion H, carried by the operating-shaft. In other words, the pinions $B^2$ and H are simultaneously thrown into and out of operative relation with the gear D as the same is shifted upon the set-shaft.

The outer edge or periphery of the wheel $C^2$ is provided with a series of teeth $D^2$. A locking-block $E^2$, mounted in the outer end of an arm $F^2$, is likewise provided upon the face adjacent to the wheel $C^2$ with a series of teeth corresponding to the teeth $D^2$. The teeth, as will be noted upon reference to Fig. 9, are constructed to resist the force of a sudden stop, but in addition to this there is also a recess at the root of each tooth on the wheel, which allows force to be applied in a forward as well as a backward direction when setting is effected by hand, as will presently appear.

The plate $C^3$ is graduated, as shown in Fig. 8, and is provided with a series of openings or holes $G^2$, into which a pin may be inserted in order to limit the amount of movement of the arm $F^2$ when said arm is swung or turned about the dial-plate to secure its initial adjustment. The pin may or may not be used, as desired.

The locking-block $E^2$, Fig. 14, is mounted, as before noted, in the outer end of the arm $F^2$, which extends downwardly adjacent to the outer face of the dial-plate. A link $H^2$ is connected to the upper end of the block $E^2$ and to the arm $F^2$, while the lower end of said block is pivotally connected to the inner end of a locking-lever $I^2$, which is fulcrumed upon a pin $J^2$. Said lever, as will be noted upon reference to Figs. 1, 2, 3, and 11, extends upwardly into a position where it may be readily grasped by the operator.

In order to hold the block $E^2$ in engagement with the teeth of the wheel $C^2$ or out of engagement with said teeth, as may be desired, a spring-pressed locking-pin $K^2$, Fig. 16, is mounted in said block and projects into one or the other of two recesses $L^2$, formed in one of the side walls of the arm $F^2$. The nose of pin $K^2$ is shown as beveled, so that when a slight force is exerted upon the lever $I^2$ said pin will ride out of either of the recesses $L^2$ and pass freely into the other.

A fixed abutment $M^2$, Fig. 8, is formed upon the column I' and affords a permanent positive stop for the index-arm $F^2$ and the wheel $C^2$. When the arm comes into contact with said stop or abutment $M^2$, its motion is of course arrested, and inasmuch as said arm is locked to the wheel $C^2$ the movement of said wheel and the shaft $A^2$, to which it is connected, is likewise arrested. As a consequence the set-shaft comes to rest at the desired point.

In order that the parts may not be subjected to too great a strain or shock when the arm comes into contact with the stop or abutment, the face of the latter is provided with a rubber cushion $N^2$, which is preferably formed with a series of air pockets or chambers, which give a greater cushioning effect.

Formed integrally with wheel $C^2$, Figs. 10 and 11, or secured to the shaft $A^2$ is a brake-wheel $O^2$, located at a point directly below said wheel. About this wheel $O^2$ there is passed a brake-band $P^2$, one end of which is permanently fixed to a rigid portion of the column I', while the opposite end has secured to it a rack $Q^2$, which meshes with a pinion $R^2$, splined to or secured upon a shaft $S^2$, mounted in suitable bearings formed on said column. A brake-lever $T^2$ is secured to the shaft $S^2$ and extends outwardly into position where it may be readily grasped by the operator. By means of this band-brake the setting action may be stopped at any moment, or the movement of the shaft $A^2$ arrested, so that the arm $F^2$ will come gradually up against the fixed abutment.

As will be noted upon reference to Figs. 1, 2, 8, and 11, the upper end of the shaft $A^2$ is squared or made polygonal in form and the short end of the indicator-arm $F^2$ is provided with a squared or polygonal stud or projection $U^2$.

If for any reason the power operating mechanism should be inoperative, the setting and receding can be performed by hand by placing cranks or handles, as $V^2$ $W^2$, upon the end of the shaft $A^2$ and the stud $U^2$, respectively, and disconnecting the pinion H, Figs. 1 and 17, from the operating-shaft G by moving the feather or key I outwardly into the position shown in dotted lines in Fig. 1. The brake-lever, with this construction, is disregarded, both hands being employed in setting, which can be quickly accomplished. The central crank or handle $V^2$ is operated to impart a receding motion to the set-shaft, if necessary.

In effecting the set by hand the block $E^2$ is first released, as in the operation of the device by power. The arm $F^2$ is then swung around to the particular point desired or up against the pin, which has been placed in one of the holes $G^2$, after which the block is locked to the wheel $C^2$ and the mechanism rotated through the agency of the handle $W^2$. As just noted, the receding motion is effected by the use of the handle $V^2$, in which case the block $E^2$ is unlocked and held in this position by the pin $K^2$.

In order to ascertain the dimensions of the log still left upon the carriage or the amount of material which has been cut, I provide a dimension index-wheel $X^2$, which works past a fixed pointer $X^3$. Motion is imparted to said wheel by a gear-wheel $X^4$, which is secured to the wheel $X^2$ or to the shaft upon which said wheel is mounted. A small pinion $X^5$ is secured to the set-shaft and meshes with the wheel $X^4$.

The operation of the mechanism is as follows: Movement of the carriage in either direction will, through the agency of the sheaves and pinions, impart a continuous rotary motion to the gear-wheel V and as a consequence place the spring $B'$ under tension. This spring will tend to rotate the drum Y, which in turn will rotate the shaft G through the friction connection above described. The amount of friction in the sheaves and the drum and in the connection between the drum and operating-shaft G will be so regulated that the spring cannot under any circumstances be subjected to a breaking strain. Just before the spring is fully wound up the pressure on all three cone-clutches or friction devices should be so adjusted that they will slip and not allow the tension of the spring at any time to increase beyond its maximum point. The ordinary working tension will be considerably less than this and is adjusted as required by the nut $G'$. This nut is under the direct control of the operator, who stands intermediate said nut and the column $I'$. When the setting is taking place, the gear D is in constant mesh with the pinions H and $B^2$, so that when the shaft $A^2$ and the pinion $B^2$ are free to rotate motion will be imparted to the set-shaft by the spring $B'$. In making a set the operator grasps the brake-lever $T^2$ and holds the shaft $A^2$ from turning. While it is thus held the index-arm $F^2$ is unlocked from the index-wheel and rotated to the desired notation or until at such time as it comes against the stop-pin, which has been previously inserted in one of the openings $G^2$. The arm is then locked to the index-wheel, and when this is done the brake-lever is released. The shaft $A^2$ is then free to turn, and as a consequence motion will be imparted to the set-shaft and the knees will be moved forward. This motion continues until the index-arm comes against the fixed abutment $M^2$. The operator can ease this movement, as above noted, should he so desire, though with the cushioning device as above described this is not absolutely essential.

As will be seen, there can be no overthrow of the parts, and the timber is consequently brought to proper position for the next cut. After the desired number of cuts have been made the receding lever $R'$ is disengaged from its spring retaining-arm $S'$ and rocked about its fulcrum, which is the shaft $P'$. This causes the shifter $N'$ to move the gear D out of mesh with the pinions H and $B^2$, permitting the pawl $V'$ to pass into engagement with the ratchet-wheel $W'$, and thereby to lock the operating-shaft G against continued movement. As the gear D is withdrawn from operative position it is moved back into contact with the friction cone or ring $J'$, which holds the set-shaft against movement which would recede the knees. By moving the lever $R'$ slightly this frictional contact can be relieved as desired, permitting the receding springs (not shown) to rotate the shaft in a direction opposite to that in which it was previously rotated, and thereby withdraw the knees preparatory to a further forward movement.

The receding movement can be stopped at any moment by simply throwing the receding lever to that position which will cause the gear D to bind or cramp within the friction cone or ring $J'$. A reverse movement of the receding lever will cause the gear D to come into operative relation with pinions H and $B^2$, and with the parts assuming such positions the projection $X'$, carried by the gear-shifter $N'$, will withdraw the pawl $V'$ from engagement with the locking ratchet-wheel $W'$.

The setting movement with the mechanism described varies from one thirty-second of an inch to four inches. A larger setting can be effected by repeated movements or preferably by disconnecting the grip and with the brake regulation allowing the setting to proceed until the required figure shows on the dimension index-wheel $X^2$ at the side of the column $I'$. The same movement will readily shove off the finished timber or last piece from the carriage to the rolls.

The spring $B'$ and the receding spring (not shown) may be termed "motors" or "power-storing" devices. They are to be distinguished, however, from the ordinary steam or air engines which have previously been employed for operating set-works.

It is manifest that the invention may be varied in its details without departing from the spirit thereof, and the broader or more generic claims are to be read with this statement in view.

Having thus described my invention, what I claim, and desire to secure by Letters Patent, is—

1. In combination with a sawmill-carriage, a set-shaft; a spring-motor mounted on the carriage; yielding connections intermediate said motor and the set-shaft for rotating said shaft in a direction to effect the setting of the log; and means for disengaging said connections and limiting the movement of the set-shaft and simultaneously arresting the operation of the spring-motor, substantially as described.

2. In combination with a sawmill-carriage, a set-shaft mounted thereon; a spring-motor mounted on the carriage; yielding connections intermediate said motor and the set-shaft; a column or standard secured to the carriage; a shaft mounted therein; connections intermediate said shaft and the set-shaft; an index-wheel secured to the shaft carried by the column; means for limiting the rotation of said wheel; and means for disconnecting the set-shaft from the motor and the shaft carried by the column and restraining the spring-motor against movement, substantially as described.

3. In combination with a sawmill-carriage, a set-shaft mounted thereon; a spring-motor for operating said set-shaft to effect the setting of the log; yielding connections intermediate said motor and the set-shaft; means for positively determining the degree of rotation of said shaft and consequently the extent of the set; and means for disconnecting the shaft from said motor and arresting the shaft and motor against further movement, substantially as described.

4. In combination with a sawmill-carriage, a set-shaft mounted thereon; a spring-motor for operating said set-shaft to effect the setting of the log; a yielding connection between said motor and the set-shaft; means for positively determining the degree of rotation of said set-shaft and consequently the extent of the set; and mechanism for simultaneously disconnecting the shaft from said motor, locking the motor against further movement, and also holding the set-shaft against further movement in either direction.

5. In combination with a sawmill-carriage, a set-shaft mounted thereon; a bevel-gear slidably mounted upon said shaft and rotatable therewith; a spring-motor; a shaft yieldingly connected to said motor; a pinion carried by said shaft and normally in mesh with said slidable gear; means for sliding the gear upon the set-shaft and withdrawing it from engagement with the pinion; and means for simultaneously arresting the motor-shaft against movement.

6. In combination with a sawmill-carriage, a set-shaft mounted thereon; a gear slidably mounted upon said shaft and rotatable therewith; a friction cone or ring adjustably mounted in line with a beveled face formed upon said gear; a spring-motor; a shaft yieldingly connected to said motor; a pinion carried by said shaft and normally meshing with the gear; and means for moving said gear out of mesh with the pinion and simultaneously arresting the motor against movement, substantially as described.

7. In combination with a sawmill-carriage, a set-shaft mounted thereon; a gear slidably mounted upon the shaft and rotatable therewith; a friction device in operative relation with said gear; a spring-motor; a pinion driven by said motor and normally in mesh with the gear; a yielding connection intermediate the motor and pinion; means for shifting the gear and at the same time locking the motor against further movement; and means for positively determining the degree of rotation of the set-shaft and consequently the extent of the set when said gear and motor are in operative relation to each other.

8. In combination with a sawmill-carriage, a set-shaft mounted thereon; a gear slidably mounted upon said shaft and rotatable therewith; a spring-motor for setting the log; a shaft rotatable by said motor; a yielding connection intermediate the motor and said shaft; a pinion carried by said second shaft and normally in mesh with the gear; a shifter for said gear; and means for locking the motor against further movement when the shifter is actuated to move the gear out of operative relation with the pinion.

9. In combination with a sawmill-carriage, a set-shaft mounted thereon; a gear slidably mounted upon said shaft and rotatable therewith; a spring-motor for setting the log; a pinion driven by said motor and normally in mesh with said gear; a yielding connection intermediate the motor and pinion; means for positively determining the degree of rotation of said set-shaft and consequently the extent of the set; means for shifting the gear; and a spring-pressed pawl for locking the motor against further movement, said pawl coming into operation as the gear is moved out of mesh with the pinion, substantially as described.

10. In combination with a sawmill-carriage; a set-shaft mounted thereon; a gear slidably mounted upon said shaft and rotatable therewith; a friction cone or ring adjustably mounted upon the carriage in operative relation with a beveled face formed upon the gear; a spring-motor for setting the log; a shaft operated by said motor; a yielding connection intermediate the motor and said shaft; a pinion carried by said shaft and normally meshing with the gear; a ratchet-wheel carried by the motor-shaft; a shifter for moving the gear out of operative connection with the pinion; and a spring-pressed pawl in line with and engaging the ratchet-wheel when said gear is shifted, substantially as and for the purpose described.

11. In combination with a sawmill-carriage, a set-shaft mounted thereon; a spring-motor also mounted upon the carriage to impart a setting motion to the shaft; an adjustable frictional connection intermediate the motor and set-shaft; frictional driving mechanism for putting the motor under tension; an operating-shaft; connections intermediate said shaft and the set-shaft; means for positively determining the degree of rotation of the set-shaft and consequently the extent of the set; and means for disconnecting the set-shaft from the motor and at the same time arresting the motor against an unwinding movement, substantially as described.

12. In combination with a sawmill-carriage, a set-shaft mounted thereon; a spring-motor for imparting a setting motion to said shaft; an adjustable frictional driving mechanism for placing the motor under stress; an operating-shaft G; an adjustable frictional device intermediate said shaft and the drum of the motor; a pinion detachably connected to said operating-shaft; means for determining the degree of rotation of the set-shaft and consequently the extent of the set; a gear mounted on the set-shaft and normally in operative relation with said means and the pinion carried by the operating-shaft; means for shifting said gear; and means for simultaneously locking the operating-shaft against an unwinding movement.

In testimony whereof I have signed my name to this specification in the presence of two subscribing witnesses.

WILLIAM H. TROUT.

Witnesses:
H. B. SCHMID,
CHAS. KOMSCHLIES, Jr.